No. 792,765. Patented June 20, 1905.

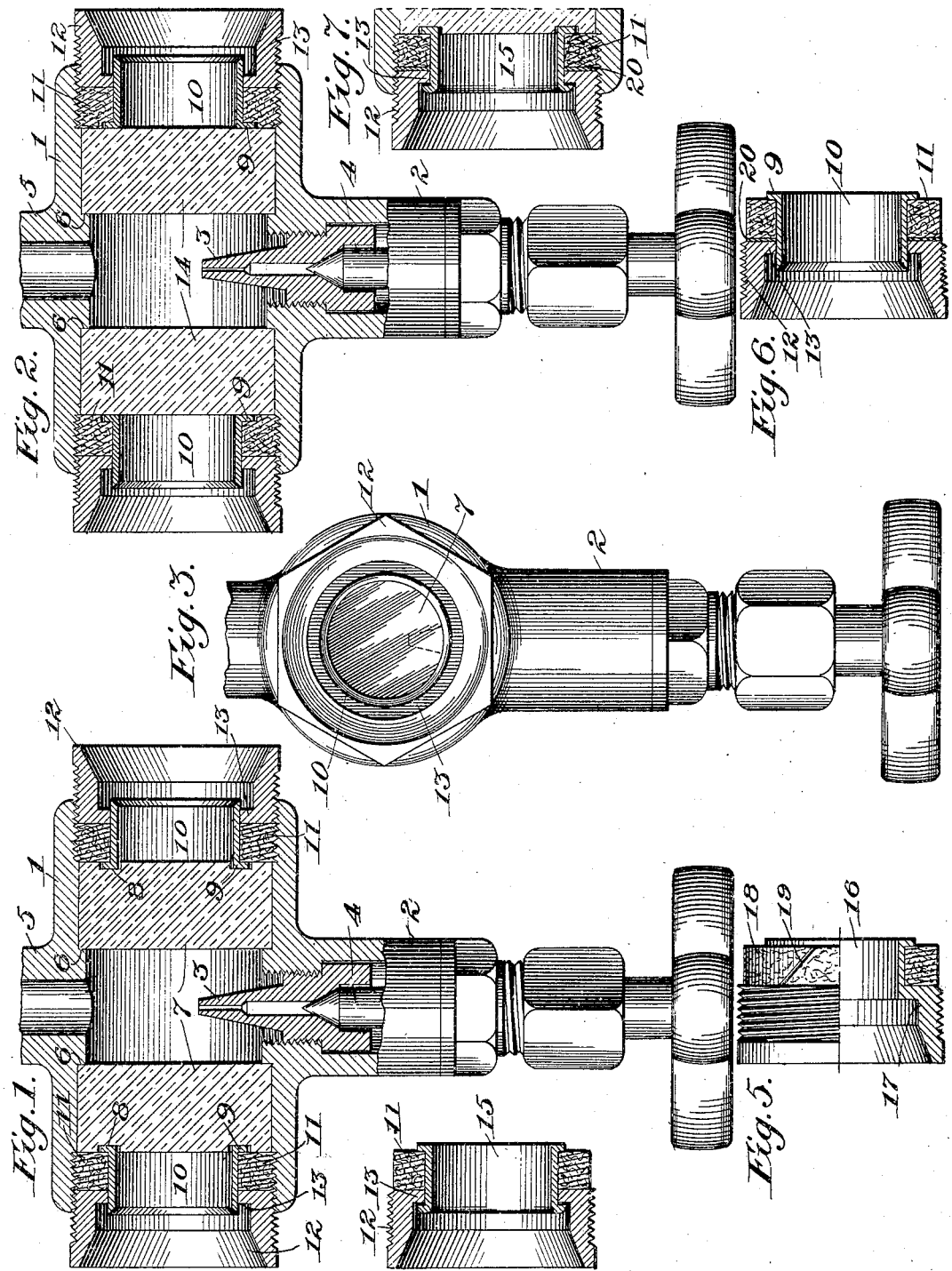

UNITED STATES PATENT OFFICE.

FRANK W. EDWARDS, OF LOGANSPORT, INDIANA, ASSIGNOR TO THE CHICAGO LUBRICATOR COMPANY, OF CHICAGO, ILLINOIS, A CORPORATION OF ILLINOIS.

SIGHT FOR LUBRICATORS.

SPECIFICATION forming part of Letters Patent No. 792,765, dated June 20, 1905.

Application filed January 4, 1905. Serial No. 239,652.

*To all whom it may concern:*

Be it known that I, FRANK W. EDWARDS, a citizen of the United States, residing at Logansport, in the county of Cass and State of Indiana, have invented a certain new and useful Improvement in Sights for Lubricators, of which the following is a full, clear, and exact description.

This invention relates to that class of sights for sight-feed condensation-displacement lubricators, particularly such as are used on locomotives, wherein instead of a glass tube there are used solid disks or panes of glass; and the invention consists of means for readily inserting the glasses and holding them in place in a fluid-tight manner and so that they may be easily and conveniently removed or replaced.

In the accompanying drawings, illustrating the invention, in the several figures of which like parts are similarly designated, Figure 1 is a longitudinal section and partial elevation of one form of the invention. Fig. 2 is a similar view of another form. Fig. 3 is an end view applicable to both forms. Figs. 4, 5, and 6 are longitudinal sections of three several modifications of the means for securing the glasses in the casing, the nut and gasket in Fig. 5 being shown in part in elevation. Fig. 7 is a longitudinal section of another modification.

Any suitable form and configuration of casing 1 to receive appropriately-shaped solid glasses and to constitute the water-chamber may be employed; but simply for illustration this specification describes a cylindrical casing and glasses. The casing is made with a nipple 2 to receive the oil-feeding tip 3 and controlling-valve 4 and also with a delivery-nipple 5. Shoulders 6 are provided, against which the glasses 7 are placed. As shown in Fig. 1, these glasses are provided on one face with circular grooves 8 to receive the foot-flanges 9 of sleeves 10, which support and center the gaskets 11, of suitable packing material, and the grooves are of a depth at least equal to the thickness of the foot-flanges 9, so that the gaskets may come flush against the faces of the glasses, and thereby form a fluid-tight joint when forced or compressed into place by the nuts 12. The base 13 of each nut is so formed, as by a flange, as to be equal in width to the gasket, so that when turned up tight the gasket will be confined between the casing and the sleeve, the gasket pressing the foot-flange of the sleeve against the glass or into its groove, and thereby the gasket will be prevented from spreading over the observation portion of the glass.

As shown in Fig. 2, the grooves may be omitted and the glass disks 14 be made plain.

As shown in Fig. 4, the outer ends of the sleeves 15 may be expanded, and thus swiveled within the nuts, so that in withdrawing the nuts the sleeves and gaskets will be drawn out also.

As shown in Fig. 5, the sleeve 16 may be an integral part of the nut 17, and in that case the gasket 18 may be cut through, as at 19, so as to be readily sprung over the foot-flange onto the sleeve. When the sleeve 16 is made an integral part of the nut 17, the recess or groove in the glass is made of a depth sufficient to allow the compression of the gasket. The foot-flange on the sleeve will retain the gasket in place and will be the means of withdrawing the gasket and preventing part of said gasket from spreading over the end of the sleeve.

As shown in Fig. 6, a gland or washer 20, of thin metal, may be interposed between the nut and gasket, so as to relieve friction between the nut and gasket in turning the nut in and out.

As shown in Fig. 7, the expanded sleeve of Fig. 4 and the washer 20 of Fig. 6 may be combined for use in connection with a glass having a groove to receive the foot-flange.

It will be understood that the nuts are preferably cylindrical and screw-threaded externally to engage internal screw-threads in the ends of the casing, as clearly shown.

The metal sleeve is of less diameter than the glass, so as to bring the elastic packing-ring within the diameter of the glass and prevent it from spreading over the glass when expanded under the compression of the nut, thus preventing the packing from encroaching on the field of vision.

The use of the groove in the disk is advantageous in that the gasket may fit flush against the glass and the foot-flange, and thus a perfect seal insured.

Glasses of any thickness may be used.

By the several constructions described a very simple and efficient means is provided for readily inserting and removing the glasses, so that in case of breakage of any glass the engineer may quickly replace it without throwing the feed out of service for any great length of time. It is to be noted of these several constructions that a full bearing-face of the gasket comes squarely against the glass, and similarly the nut has its contact with the gasket, or, in other words, the planes of pressure or resistance are parallel, and hence the maximum efficiency of the gasket is available.

Gaskets of any symmetrical cross-section may be used, and while the square cross-section is shown the invention is not limited thereto.

What I claim is—

1. A sight for lubricators, having a casing, a glass therein, a gasket, a sleeve supporting the gasket next the face of the glass, and a nut encircling the sleeve and in contact with the gasket.

2. A sight for lubricators, having a casing, a glass therein, a gasket, a sleeve having a foot-flange and supporting the gasket next the face of the glass, and a nut encircling the sleeve and in contact with the gasket.

3. A sight for lubricators, having a casing, a glass therein, provided with a circular groove in its face to receive the foot-flange of the sleeve, a gasket, a sleeve having a foot-flange and supporting the gasket next the face of the glass, and a nut encircling the sleeve and in contact with the gasket.

4. A sight for lubricators, having a casing, a glass therein, a gasket, a sleeve supporting the gasket next the face of the glass and having a foot-flange, and a nut encircling the sleeve and in contact with the gasket, said sleeve expanded in the nut and removable with it.

5. A sight for lubricators, comprising a casing, a glass therein, a gasket, a washer next said gasket, a sleeve upon which the gasket and washer are mounted, and a nut encircling the sleeve and engaging the casing and adapted to be turned up against the washer and thereby force the gasket into fluid-tight engagement with the face of the glass, the sleeve meanwhile preventing the gasket from obtruding in the field of vision.

6. A sight for lubricators, having an internally-shouldered casing, glasses arranged in said casing against its shoulders, gaskets arranged next the faces of said glasses, sleeves encircled by said gaskets, and nuts encircling the sleeves and adapted to compress the gaskets against the glasses.

7. A sight for lubricators, having an internally-shouldered and screw-threaded casing, a glass arranged in said casing against its shoulder, a gasket arranged next the face of the glass, a sleeve encircled by said gasket and a nut encircling the sleeve and engaging the screw-threads in the casing and adapted to force the gasket against the glass and secure the glass in the casing in a fluid-tight and readily-removable manner.

In testimony whereof I have hereunto set my hand this 2d day of January, A. D. 1905.

FRANK W. EDWARDS.

Witnesses:
F. H. WIPPERMAN,
JOSEPH G. LONG.